(12) United States Patent
Akiba et al.

(10) Patent No.: US 9,896,374 B2
(45) Date of Patent: *Feb. 20, 2018

(54) GLASS FOR CHEMICAL TEMPERING AND CHEMICALLY TEMPERED GLASS

(71) Applicant: ASAHI GLASS COMPANY, LIMITED, Chiyoda-ku (JP)

(72) Inventors: Shusaku Akiba, Tokyo (JP); Shigeki Sawamura, Tokyo (JP); Suguru Murayama, Tokyo (JP); Hiroyuki Ohkawa, Tokyo (JP); Yusuke Kobayashi, Tokyo (JP); Kazutaka Ono, Tokyo (JP); Tetsuya Nakashima, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,390

(22) Filed: Mar. 9, 2017

(65) Prior Publication Data

US 2017/0183254 A1   Jun. 29, 2017

Related U.S. Application Data

(63) Continuation of application No. 14/255,073, filed on Apr. 17, 2014, now Pat. No. 9,656,906, which is a
(Continued)

(30) Foreign Application Priority Data

Nov. 18, 2011  (JP) .................................. 2011-253102
Jun. 1, 2012  (JP) .................................. 2012-126388

(51) Int. Cl.
*B32B 17/06* (2006.01)
*C03C 3/091* (2006.01)
(Continued)

(52) U.S. Cl.
CPC .............. *C03C 3/091* (2013.01); *C03C 3/085* (2013.01); *C03C 3/087* (2013.01); *C03C 4/18* (2013.01);
(Continued)

(58) Field of Classification Search
USPC ....... 428/409, 410, 426, 432, 688, 689, 699, 428/701, 702
See application file for complete search history.

(56) References Cited

U.S. PATENT DOCUMENTS 7,666,511 B2   2/2010 Ellison et al.
2009/0079671 A1   3/2009 Nishi et al.
(Continued)

FOREIGN PATENT DOCUMENTS

JP   11-171597   6/1999
JP   2007-11210   1/2007
(Continued)

OTHER PUBLICATIONS

International Search Report dated Feb. 26, 2013 in PCT/JP2012/079849 filed Nov. 16, 2012.
(Continued)

*Primary Examiner* — Lauren R Colgan
(74) *Attorney, Agent, or Firm* — Oblon, McClelland, Maier & Neustadt, L.L.P.

(57) ABSTRACT

To provide chemically tempered glass which is less likely to break even if scratched. Chemically tempered glass, which comprises, as represented by mole percentage based on the following oxides, from 56 to 72% of $SiO_2$, from 8 to 20% of $Al_2O_3$, from 9 to 25% of $Na_2O$, from 0 to 2% of $K_2O$, and from 0 to 15% of MgO, and which has a surface compressive stress of at least 900 MPa and an internal tensile stress of at most 30 MPa. Glass for chemical tempering, which comprises, as represented by mole percentage based on the following oxides, from 56 to 69% of $SiO_2$, from 8 to 16% of $Al_2O_3$, from 9 to 22% of $Na_2O$, from 0 to 1% of $K_2O$, from 5.5 to 14% of MgO, from 0 to 2% of $ZrO_2$, and from 0 to 6% of $B_2O_3$.

19 Claims, 4 Drawing Sheets

Related U.S. Application Data continuation of application No. PCT/JP2012/079849, filed on Nov. 16, 2012.

(51) Int. Cl.

| | | |
|---|---|---|
| *C03C 3/085* | (2006.01) | |
| *C03C 3/087* | (2006.01) | |
| *C03C 4/18* | (2006.01) | |
| *C03C 21/00* | (2006.01) | |
| *G06F 1/16* | (2006.01) | |

(52) U.S. Cl.
 CPC ........ *C03C 21/002* (2013.01); *C03C 2204/00* (2013.01); *G06F 1/1637* (2013.01)

(56) References Cited

U.S. PATENT DOCUMENTS

| | | |
|---|---|---|
| 2009/0197088 A1 | 8/2009 | Murata |
| 2009/0220761 A1 | 9/2009 | Dejneka et al. |
| 2009/0298669 A1 | 12/2009 | Akiba et al. |
| 2010/0035745 A1 | 2/2010 | Murata |
| 2010/0087307 A1 | 4/2010 | Murata et al. |
| 2011/0014475 A1 | 1/2011 | Murata |
| 2011/0017297 A1 | 1/2011 | Aitken et al. |
| 2011/0091704 A1 | 4/2011 | Akiba |
| 2011/0227846 A1 | 9/2011 | Imazeki |
| 2012/0083401 A1 | 4/2012 | Koyama et al. |
| 2012/0171497 A1 | 7/2012 | Koyama et al. |
| 2013/0011650 A1 | 1/2013 | Akiba et al. |
| 2013/0034670 A1 | 2/2013 | Hashimoto |
| 2013/0302617 A1 | 11/2013 | Akiba et al. |

FOREIGN PATENT DOCUMENTS

| | | |
|---|---|---|
| JP | 2009-57271 | 3/2009 |
| JP | 2010-059038 | 3/2010 |
| JP | 2012-148955 | 8/2012 |
| JP | 2012-214356 | 11/2012 |
| TW | 201118054 A1 | 6/2011 |
| WO | 2011-011667 | 1/2011 |
| WO | 2011/145661 | 11/2011 |

OTHER PUBLICATIONS

M. M. Smedskjaer et al., "Sodium diffusion in boroaluminosilicate glasses", Journal of Non-Crystalline Solids, vol. 357 (2011) pp. 3744-3750.

GLASS FOR CHEMICAL TEMPERING AND CHEMICALLY TEMPERED GLASS

CROSS-REFERENCE TO RELATED APPLICATIONS

The present application is a continuation application of U.S. patent application Ser. No. 14/255,073 filed Apr. 17, 2014 (now U.S. Pat. No. 9,656,906), which is in turn a continuation of PCT Application No. PCT/JP2012/079849, filed on Nov. 16, 2012, which is based upon and claims the benefit of priority from Japanese Patent Application No. 2011-253102 filed on Nov. 18, 2011 and Japanese Patent Application No. 2012-126388 filed on Jun. 1, 2012. The contents of those applications are incorporated herein by reference in their entireties.

TECHNICAL FIELD

The present invention relates to a display device for e.g. a mobile device such as a cell phone, a personal digital assistance (PDA) or a tablet PC, a touch panel, or a large-sized flat screen television such as a large-sized liquid crystal television, and a glass plate for a display device suitable for e.g. a cover glass for a display device, as well as chemically tempered glass or glass for chemical tempering suitable for such a glass plate.

BACKGROUND ART

In recent years, for display devices for e.g. mobile devices such as cell phones, PDA or tablet PC, touch panels, liquid crystal televisions, etc., a cover glass (protective glass) has been used in many cases to protect a display and to improve appearance. Further, in the case of e.g. a cover glass for a flat screen television such as a liquid crystal television, surface treatment may be carried out for e.g. forming a film having such a function as antireflection, prevention of impact failure, magnetic wave-shielding, near infrared ray-shielding or color-adjustment.

For such display devices, weight reduction and thickness reduction are required for differentiation by the flat screen design or for reduction of the load for transportation.

Therefore, a cover glass to be used for protecting a display is also required to be made thin. However, if the thickness of the cover glass is made thin, the strength is thereby lowered, and there has been a problem such that the cover glass itself is likely to be broken e.g. on impact by a falling or flying object in the case of an installed type or when dropped during the use in the case of a portable device, and the cover glass cannot perform the essential role to protect the display device.

In order to solve the above problem, it is conceivable to improve the strength of the cover glass, and as such a method, a method to form a compressive stress layer at the glass surface is commonly known.

The method to form a compressive stress layer at the glass surface, may typically be an air quenching tempering method (physical tempering method) wherein a surface of a glass plate heated to near the softening point is quenched by air cooling or the like, or a chemical tempering method wherein alkali metal ions having a small ion radius (typically Li ions or Na ions) at a glass plate surface are exchanged with alkali ions having a larger ion radius (typically K ions) by ion exchange at a temperature lower than the glass transition point.

As mentioned above, the thickness of the cover glass is required to be thin. However, if the air quenching tempering method is applied to a thin glass plate having a thickness of less than 2 mm, as required for a cover glass, the temperature difference between the surface and the inside tends not to arise, and it is thereby difficult to form a compressive stress layer, and the desired property of high strength cannot be obtained. Therefore, a cover glass tempered by the latter chemical tempering method is usually used.

As such a cover glass, one having soda lime glass chemically tempered is widely used (e.g. Patent Document 1).

Soda lime glass is inexpensive and has a feature that the surface compressive stress S (hereinafter in this specification, "surface compressive stress S" may be referred to simply as "S") of a compressive stress layer formed at the surface of the glass by the chemical tempering can be made to be at least 550 MPa, but there has been a problem that it has been difficult to make the thickness t of the compressive stress layer (hereinafter in this specification, "the thickness of the compressive stress layer" may be referred to also as "the compressive stress layer depth") to be at least 20 μm. The glass in Example 49 given hereinafter is soda lime glass.

Therefore, one having $SiO_2$—$Al_2O_3$—$Na_2O$ type glass different from soda lime glass, chemically tempered, has been proposed for such a cover glass (e.g. Patent Documents 2 and 3).

Such $SiO_2$—$Al_2O_3$—$Na_2O$ type glass has a feature that it is possible not only to make the above S to be at least 550 MPa but also to make the above t to be at least 20 μm. The glass in Example 47 given hereinafter is such glass and has heretofore been used as a cover glass.

PRIOR ART DOCUMENTS

Patent Documents

Patent Document 1: JP-A-2007-11210
Patent Document 2: US Patent Application Publication No. 2009/0298669
Patent Document 3: US Patent Application Publication No. 2008/0286548

DISCLOSURE OF INVENTION

Technical Problem

It is highly possible that a mobile device is dropped from the user's hand, pocket or bag, and its cover glass gets flaws (indentations), or the dropped mobile device may be stepped on or the user may sit on the mobile device put in the pocket, and a heavy load may thereby be applied to the cover glass in many cases.

The surface compressive stress S of cover glasses which have been widely used is from 650 to 750 MPa, but in recent years, a cover glass with S larger than that level has been desired.

On the other hand, also a flat screen television such as a liquid crystal television or a plasma television, particularly a large-sized flat screen television having a size of at least 20 inches, is likely to get flaws since its cover glass has a large size, and as the screen is large, the possibility of breakage starting from such flaws is high. Further, when a flat screen television is used as hung on the wall, it may fall down, and in such a case, a large load may be applied to the cover glass.

A touch panel is likely to get flaws such as scratches at the time of its use.

As such large or small display devices are used more widely now, the number of incidences of breakage of the cover glass itself is increased as compared with the past when the number of use was small or limited.

When the exterior surface being the main surface of a cover glass is referred to simply as the surface and the inside surface is referred to as the rear surface, portions of the cover glass susceptible to breakage may be classified into the surface side of an edge of the cover glass, the rear surface side of an edge of the cover glass, the surface of the cover glass and the rear surface of the cover glass. The rear surface side of an edge is close to a bending mode, and therefore, S should better be large. The surface side of an edge is susceptible to Hertzian Cone type breakage, and therefore, S should better be large. Also in a case where the cover glass will be fractured from the rear surface, it undergoes breakage in a ball-on-ring bending mode, and it is therefore considered that S should better be large. Thus, a cover glass, of which S can be made large, is desired.

On the other hand, in a fracture mode in which the breakage starts from the surface of the cover glass, cracks originated from the surface will act on the internal tensile stress and thereby lead to breakage. Thus, from a study made by the present inventors, it has been found that as the internal tensile stress becomes small, the fracture tends to be less likely to take place.

It is an object of the present invention to provide chemically tempered glass and glass for chemical tempering, which are, as compared with the conventional ones, less susceptible to breakage and less likely to get flaws, even if a large load is exerted thereto.

Solution to Problem

The present invention provides chemically tempered glass, which comprises, as represented by mole percentage based on the following oxides, from 56 to 72% of $SiO_2$, from 8 to 20% of $Al_2O_3$, from 9 to 25% of $Na_2O$, from 0 to 2% of $K_2O$, and from 0 to 15% of MgO, and which has a surface compressive stress of at least 900 MPa and an internal tensile stress CT (hereinafter in this specification, "internal tensile stress CT" may be referred to simply as "CT") of at most 34 MPa, preferably at most 30 MPa.

With respect to the above numerical value ranges, for example "from 56 to 72%" is meant for "at least 56% and at most 72%".

By adjusting the surface compressive stress S to be at least 900 MPa, it is possible to reduce breakage from the surface side of an edge, the rear surface side of an edge and the rear surface of the cover glass, as compared with conventional glass which is recently commercially available (glass in Example 47 given hereinafter, provided that S is 884 MPa). Further, by adjusting CT to be as specified above, it is possible to reduce breakage from the surface of the cover glass. This is evident from the plotting in a sand paper ball drop test as shown in FIG. 1 wherein the resistance against this impact test starts to increase when CT is lowered to 38 MPa, and this resistance clearly increases when CT becomes 34 MPa or less, preferably 30 MPa or less. Therefore, by using a cover glass with CT being at most 30 MPa, it is possible to use the glass in such a state as having a higher slow cracking resistance. In the test, of which the results are shown in FIG. 1, glass in Example 17 given hereinafter, was used.

Here, the sand paper drop test is a test wherein a chemically tempered glass plate is placed on a base made of granite, and in such a state that the rubbing surface of #30 sand paper is in contact with the upper surface of the chemically tempered glass plate, a stainless steel sphere having a mass of 28 g and a diameter Φ of 0.75 inch i.e. 19.1 mm is dropped to let slow cracking take place.

Here, the slow cracking is meant for cracking such that glass undergoes cracking at a relatively slow rate starting from a flaw which extends through a compressive stress layer of the glass. For example, in a case where a flat panel display device is dropped by mistake and an impact is exerted to its cover glass, the chemically tempered cover glass may undergo cracking even when the impact is not so large. This is considered to be attributable to slow cracking which takes place such that the glass undergoes cracking at a relatively slow rate starting from a flaw which extends through the compressive stress layer.

FIG. 1 shows the results of the above test wherein chemically tempered glasses having various internal tensile stresses were prepared by applying chemical tempering treatment to glass in Example 17 given hereinafter which was 50 mm×50 mm×1 mmt and which had mirror polishing applied to both surfaces, and their impact failure heights were measured by the above test. The abscissa represents the internal tensile stress CT and the ordinate represents Height i.e. the stainless steel sphere-dropping height. The value for the dropping height is an average at 15 points, and its standard deviation is shown by an error bar.

Further, the present invention provides the above chemically tempered glass, of which the mass reduction per unit surface area is at most 1.02 $mg/cm^2$, when immersed in hydrochloric acid having a concentration of 0.1 mol % at a temperature of 90° C. for 20 hours.

Further, the present invention provides the above chemically tempered glass, of which the mass reduction per 1 $cm^2$ is at most 0.31 mg, when the glass having a size of 40 mm×40 mm×(from 0.6 to 1.3 mmt) is immersed in 0.1 mol/l hydrochloric acid heated to a temperature of 90° C. for 20 hours.

Further, the present invention provides a chemically tempered glass plate, which comprises, as represented by mole percentage based on the following oxides, from 56 to 72% of $SiO_2$, from 8 to 20% of $Al_2O_3$, from 9 to 25% of $Na_2O$, from 0 to 2% of $K_2O$, and from 0 to 15% of MgO, and which has a surface compressive stress of at least 900 MPa, a compressive stress layer thickness (hereinafter in this specification, the "compressive stress layer thickness" may sometimes be referred to simply as "t") of at most 32 μm and a thickness of at most 1 mm.

By adjusting the surface compressive stress S to be at least 900 MPa, it is possible to remarkably improve the strength of the surface side of an edge, the rear surface side of an edge and the rear surface of the glass. Further, by adjusting the compressive stress layer thickness t to be at least 32 μm, it is possible to make the resistance of flexural strength sufficient typically after scratched. This is evident from the data plotted in FIG. 2 which show that t of 32 μm is sufficient.

FIG. 2 is one wherein a glass plate of 50 mm×50 mm×0.8 mmt comprising, as represented by mole percentage, 73% of $SiO_2$, 7% of $Al_2O_3$, 6% of MgO and 14% of $Na_2O$, was prepared, its surface of 50 mm×50 mm was mirror-polished, followed by chemical tempering treatment to prepare three types of chemically tempered glass plates having a surface compressive strain of 700 MPa each and compressive stress layer thicknesses of 15 μm, 29 μm and 52 μm, respectively, and such glass plates were subjected to a four point bending test with a lower span of 40 mm and an upper span of 10 mm, whereupon the four point bending fracture stresses were plotted. The ordinate represents the four point bending fracture strength, which is represented by 4PBStress in the FIG., and the abscissa represents the compressive stress layer thickness, which is represented by DOL in the FIG. Further, the test was carried out also with respect to a non-tempered glass plate, and the test result was plotted at DOL of 0 μm. The value for the four point bending fracture stress is an average at 15 points, and its standard deviation is shown by an error bar.

Here, the approximate curve in the FIG. is represented by $y=0.0021x^3-0.4919x^2+27.519x+118.49$, where x is the compressive stress layer thickness, and y is the four point bending fracture strength.

From this FIG., it is evident that in a region where the compressive stress layer thickness is 29 μm or more, a remarkable increase in the bending fracture strength tends to be no longer observed, the bending fracture strength becomes the maximum at 36 μm or 37 μm, and at a compressive stress layer thickness of more than that level, the bending fracture strength tends to decrease, and after all, the compressive stress layer thickness may be up to 36 μm or 37 μm, and is sufficient when it is 32 μm. Here, the reason as to why the bending fracture strength tends to decrease in a region where the compressive stress layer thickness is more than 36 μm or 37 μm, is considered to be such that chemical tempering is carried out for a long time in order to make the compressive stress layer to be thick, whereby due to stress relaxation, the surface compressive stress has decreased. Further, FIG. 2 is one where the surface compressive stress is 700 MPa, but even when the compressive stress is, for example, 500 MPa or 900 MPa, the above-described conclusion is not changed from one where the surface compressive stress is 700 MPa. The reason is considered to be such that when the degree of the surface compressive stress changes, only the degree of the flexural strength is changed, and the relation of the flexural strength to the compressive stress layer thickness depends on whether or not the thickness of the compressive stress layer added by the chemical tempering covers the length of the flaws distributed at the surface and does not depend on the degree of the surface compressive stress.

On the other hand, soda lime glass which used to be employed for a cover glass, has been used with a compressive stress layer thickness of about 9 μm. Therefore, the compressive stress layer thickness is considered to be suitably within a range of from 9 to 32 μm.

Further, the present invention provides the above chemically tempered glass plate, of which the mass reduction per unit surface area is at most 1 mg/cm$^2$, when immersed in hydrochloric acid having a concentration of 0.1 mol % at a temperature of 90° C. for 20 hours.

Further, the present invention provides the above chemically tempered glass plate, of which the mass reduction per 1 cm$^2$ is at most 1 mg, when the glass having a size of 40 mm×40 mm×(from 0.6 to 1.3 mmt) is immersed in 0.1 mol/hydrochloric acid heated to 90° C. for 20 hours.

Further, the present invention provides glass for chemical tempering, which comprises, as represented by mole percentage based on the following oxides, from 56 to 73% of $SiO_2$, from 6 to 20% of $Al_2O_3$, from 9 to 25% of $Na_2O$, from 0 to 2% of $K_2O$, and from 0 to 15% of MgO (hereinafter this glass for chemical tempering may sometimes be referred to as glass of the present invention).

Further, the present invention provides glass for chemical tempering, which comprises, as represented by mole percentage based on the following oxides, from 56 to 72% of $SiO_2$, from 8 to 20% of $Al_2O_3$, from 9 to 25% of $Na_2O$, from 0 to 2% of $K_2O$, and from 0 to 15% of MgO (this glass for chemical tempering is glass of the present invention).

Further, the present invention provides glass for chemical tempering, which comprises, as represented by mole percentage based on the following oxides, from 56 to 69% of $SiO_2$, from 8 to 16% of $Al_2O_3$, from 9 to 22% of $Na_2O$, from 0 to 1% of $K_2O$, from 5.5 to 14% of MgO, from 0 to 2% of $ZrO_2$, and from 0 to 6% of $B_2O_3$ (hereinafter this glass for chemical tempering may sometimes be referred to as glass A of the present invention).

Further, the present invention provides the above glass for chemical tempering, wherein MgO is at least 7%, and $ZrO_2$ is from 0 to 0.5%.

Further, the present invention provides the above glass for chemical tempering, wherein the difference ($SiO_2-MgO$) obtained by subtracting the content of MgO from the content of $SiO_2$ (the content of $SiO_2$ as represented by mole percentage, the same applies hereinafter) is at most 64%.

Further, the present invention provides the above glass for chemical tempering, wherein the difference ($Al_2O_3-MgO$) obtained by subtracting the content of MgO from the content of $Al_2O_3$ is at most 9%.

Further, the present invention provides the above glass for chemical tempering, wherein Z calculated by the following formula by using the contents, as represented by mole percentage, of the respective components of $SiO_2$, $Al_2O_3$, $Na_2O$, MgO, $B_2O_3$ and $K_2O$ is at least 1,000:

$$Z=2\times SiO_2+55\times Al_2O_3+22\times Na_2O+15\times MgO-30\times B_2O_3-126\times K_2O$$

FIG. 3 is a graph wherein Z calculated from the compositions of glasses in Examples 1, 3, 5 to 6, 9, 11 to 21, 26, 27, 29 and 34 to 50 given hereinafter, and the surface compressive stresses S (unit: MPa) when these glasses were immersed in a molten salt of $KNO_3$ at 425° C. for 10 hours for chemical tempering treatment, were plotted. Here, the formula of the straight line in the FIG. is $S=0.9993\times Z+29.985$.

As is evident from FIG. 3, Z is interrelated with S, and when Z is adjusted to be at least 870, S becomes to be at least 900 MPa, whereby it is possible to obtain such an effect that as compared with conventional glass, it is possible to reduce fracture of a cover glass due to three fracture modes i.e. the surface side of an edge, the rear surface side of an edge and the rear surface of the glass, among the four fracture modes. By adjusting Z to be at least 1,000, it is possible to make S to be at least 1,030 MPa, whereby the strength is further improved.

Further, the present invention provides the above glass for chemical tempering, wherein Z4 calculated by the following formula by using the contents, as represented by mole percentage, of the respective components of $Al_2O_3$, $K_2O$ and MgO is at least 35:

$$Z4=3\times Al_2O_3-10\times K_2O+MgO$$

FIG. 4 is a graph wherein Z4 calculated from the compositions of glasses in Examples 1, 3, 5 to 6, 9, 11 to 21, 26, 27, 29 and 34 to 50 given hereinafter, and the surface compressive stresses S (unit: MPa) when these glasses were immersed in a molten salt of $KNO_3$ at 425° C. for 10 hours for chemical tempering treatment, were plotted. Here, the formula of the straight line in the FIG. is $S=18.851\times Z4+442.34$.

As is evident from FIG. 4, Z4 is interrelated with S, and by adjusting Z to be at least 24, it is possible to make S to be at least 900 MPa, whereby it is possible to obtain such an effect that as compared with conventional glass, it is possible to reduce fracture of a cover glass due to three fracture modes i.e. the surface side of an edge, the rear surface side of an edge and the rear surface of the glass, among the four fracture modes. By adjusting Z to be at least 35, it is possible to make S to be at least 1,000 MPa, whereby the strength is further improved.

Further, the present invention provides the above glass for chemical tempering, wherein X calculated by the following formula by using the contents, as represented by mole percentage, of the respective components of $SiO_2$, $Al_2O_3$, $Na_2O$ and MgO is at most 1.3:

$$X=-0.4\times SiO_2-0.5\times Al_2O_3-0.4\times Na_2O-0.4\times MgO+41.5$$

FIG. 5 is a graph wherein X calculated from the compositions of glasses in Examples 1 to 21, 29, 30 and 47 to 49 given hereinafter, and the after-described cracking probability P when these glasses were subjected to chemical tempering treatment (hereinafter in this specification, the "cracking probability P" may sometimes be referred to simply as "P"), were plotted. Here, the formula of the curved line in the FIG. is P=0.2027×LN(X)+0.6959, wherein LN(X) is a natural logarithm of X.

As is evident from FIG. 5, X is interrelated with P, and by adjusting X to be at most 1.3, it is possible to make P to be smaller than P of conventional glass i.e. smaller than 0.75. X is preferably at most 1.

Further, the present invention provides the above glass for chemical tempering, wherein Y1 calculated by the following formula by using the contents, as represented by mole percentage, of the respective components of $SiO_2$, $Al_2O_3$, $Na_2O$, MgO, $K_2O$ and $B_2O_3$ is less than −600:

$$Y1=SiO_2+15\times Al_2O_3-50\times Na_2O-25\times K_2O-25\times MgO-25\times B_2O_3$$

Further, the present invention provides the above glass for chemical tempering, wherein Y2 calculated by the following formula by using the contents, as represented by mole percentage, of the respective components of $SiO_2$, $Al_2O_3$, $Na_2O$, MgO, $K_2O$ and $B_2O_3$ is less than −245:

$$Y2=SiO_2+25\times Al_2O_3-40\times Na_2O-20\times K_2O-10\times MgO-10\times B_2O_3$$

Further, the present invention provides the above glass for chemical tempering, wherein the difference ($Na_2O-Al_2O_3$) obtained by subtracting the content of $Al_2O_3$ from the content of $Na_2O$ is less than 5%.

Further, the present invention provides the above glass for chemical tempering, wherein R calculated by the following formula by using the contents, as represented by mole percentage, of the respective components of $SiO_2$, $Al_2O_3$, $Na_2O$, MgO and $K_2O$ is at least −100:

$$R=0.5\times SiO_2+15\times Al_2O_3-17\times Na_2O-5\times K_2O+1.5\times MgO$$

Further, the present invention provides the above glass for chemical tempering, wherein Z2 calculated by the following formula by using the contents, as represented by mole percentage, of the respective components of $SiO_2$, $Al_2O_3$, $Na_2O$, MgO and $ZrO_2$ is at least 860:

$$Z2=3.5\times SiO_2+85\times Al_2O_3+0.80\times Na_2O+2.0\times MgO+81\times ZrO_2$$

FIG. 6 is a graph wherein Z2 calculated from the compositions of glasses in Examples 1, 3, 5 to 7, 9, 11 to 21, 27, 29, 34 to 46, 48, 50 and 52 to 56 given hereinafter, and the surface compressive stresses S (unit: MPa) when these glasses were immersed in a molten salt of $KNO_3$ at 425° C. for 10 hours for chemical tempering treatment, were plotted. Here, the formula of the straight line in the FIG. is S=0.8828×Z2+140.83.

As is evident from FIG. 6, Z2 is interrelated with S, and by adjusting Z2 to be at least 860, it is possible to make S to be at least 900 MPa, whereby it is possible to obtain such an effect that as compared with conventional glass, it is possible to reduce fracture of a cover glass due to three fracture modes i.e. the surface side of an edge, the rear surface side of an edge and the rear surface of the glass, among the four fracture modes. When it is desired to bring S to be at least 1,000 MPa, at least 1,100 MPa, at least 1,200 MPa or at least 1,300 MPa, it is preferred to adjust Z2 to be at least 1,000, at least 1,100, at least 1,200 or at least 1,300, respectively. Z2 is preferably at least 1,300.

Further, the present invention provides the above glass for chemical tempering, wherein Z3 calculated by the following formula by using the contents, as represented by mole percentage, of the respective components of $SiO_2$, $Al_2O_3$, $Na_2O$, MgO and $ZrO_2$ is at most 0.150:

$$Z3=-0.00722\times SiO_2+0.0264\times Al_2O_3+0.0149\times Na_2O+0.0035\times MgO-0.0204\times ZrO_2$$

FIG. 7 is a graph wherein Z3 calculated from the compositions of glasses in Examples 17, 29, 30, 34, 35, 38 to 45 and 52 to 56 given hereinafter, and, as indices for acid resistance, the values (unit: mg/cm$^2$) obtained by dividing the mass reductions as between before and after immersion of these glasses in 0.1 mol/l hydrochloric acid warmed to 90° C. for 20 hours, by the glass surface areas, were plotted. From FIG. 7, it is evident that when Z3 is adjusted to be at most 0.150, the acid resistance is remarkably improved, and the index for acid resistance becomes distinctly small as compared with the after-mentioned preferred level i.e. 1 mg/cm$^2$.

FIG. 8 is an enlarged view of the vicinity of the origin in FIG. 7, and the formula of the straight line in FIG. 8 is W=0.8567×Z3×0.0009, where W is an index for acid resistance.

As is evident from FIG. 8, between Z3 and the index for acid resistance, there is a linear correlation when Z3 is at most 0.150. When Z3 is made to be at most 0.150, the acid resistance becomes at most 0.18, whereby it is possible to obtain chemically tempered glass and glass having a high acid resistance which is advantageous for e.g. a photolithography process.

Further, the present invention provides the above glass for chemical tempering, wherein the total content of $SiO_2$, $Al_2O_3$, $Na_2O$, MgO and $B_2O_3$ is at least 98%.

Further, the present invention provides the above glass for chemical tempering, wherein the total content of $SiO_2$, $Al_2O_3$, $Na_2O$ and MgO is at least 98%.

Further, the present invention provides the above glass for chemical tempering, of which the liquid phase temperature TL is at most a temperature T4 at which the viscosity becomes 10$^4$ dPa·s. (TL-T4) is preferably at most −10° C., more preferably at most −20° C.

Further, the present invention provides glass for chemical tempering, whereby a cracking probability P such that when it is formed into a glass plate having a thickness of 1 mm and chemically tempered, and a force of 1.96N is exerted on a mirror-polished surface of the chemically tempered glass plate by using a pyramid-shaped diamond indenter with a vertex angle of 110°, cracking takes place on the surface of the chemically tempered glass plate, is at most 0.80.

Further, the present invention provides a glass plate made of the above glass for chemical tempering.

Further, the present invention provides a chemically tempered glass obtained by chemically tempering the glass for chemical tempering.

Further, the present invention provides the above chemically tempered glass, wherein the chemical tempering is carried out within 10 hours by means of a molten salt of potassium nitrate of at least 425° C.

Further, the present invention provides the above chemically tempered glass, which has a surface compressive stress of at least 1,000 MPa.

Further, the present invention provides the above chemically tempered glass, which has a compressive stress layer thickness of at least 20 μm.

Further, the present invention provides a glass plate for a display device obtained by chemically tempering a glass plate made of the above glass for chemical tempering.

Further, the present invention provides a display device having a cover glass made of the above glass plate for a display device.

Further, the present invention provides a cover glass made of the above chemically tempered glass or the above chemically tempered glass plate.

Further, the present invention provides a display device having the above cover glass.

Further, the present invention provides the above display device, wherein the display device is a mobile device, a touch panel or a flat screen television having a size of at least 20 inches.

Further, the present invention provides a touch panel which has a glass substrate having an electrode for detecting an input position formed thereon, wherein the glass substrate is made of the above chemically tempered glass or the above chemically tempered glass plate.

The touch panel of the present invention has a glass having an electrode for detecting an input position formed thereon, i.e. a touch sensor-equipped chemically tempered glass. The touch sensor-equipped chemically tempered glass comprises a touch sensor and a chemically tempered glass for mounting the touch sensor, and it is used for a display device of 2-in-1 system. That is, the touch sensor-equipped chemically tempered glass has both a function as a cover glass and a function as a substrate for the sensor.

The touch sensor-equipped chemically tempered glass can be produced by using a photolithography technique for the formation of the touch sensor. Therefore, the chemically tempered glass of the present invention and the glass of the present invention preferably have acid resistance. Specifically, when they are immersed in 0.1 mol % hydrochloric acid at a temperature of 90° C. for 20 hours, their mass reduction is preferably at most 1 mg/cm$^2$, more preferably at most 0.18 mg/cm$^2$, particularly preferably at most 0.15 mg/cm$^2$. By using a chemically tempered glass having such high acid resistance, it is possible to mount a touch sensor on the chemically tempered glass by means of a photolithography technique. Here, in the case of employing such a photolithography technique, the above mass reduction is preferably less than 0.1 mg/cm$^2$.

Heretofore, with respect to the resistance against cracking of a cover glass, a Vickers indenter used to be employed for the test. Whereas, the present invention relating to glass A has been accomplished by investigating the relation between the cracking and the glass composition by using an indenter having a sharper angle and based on a discovery such that there is a distinct correlation between the above S and the contents of $SiO_2$, $Al_2O_3$, $Na_2O$ and $MgO$ in the glass.

With respect to the resistance against cracking of a cover glass, it is important to know what type of a substance is in contact with the glass from the viewpoint of whether or not a flaw will remain on the glass surface. Particularly, if a hard substance such as sand (sand formed mainly of $SiO_2$ or the like) is contacted, the glass surface may be impacted to form indentations, and cracks or scratches derived therefrom will remain. The angle of the substance in contact at that time is important from the viewpoint of whether or not cracking will start from such scratches. When the distribution of angles of a sand produced in Yokohama-city (in Japan) was actually measured, frequency of one having angles of from about 90 to 110° was high.

Heretofore, with respect to the resistance against cracking of a cover glass, a test used to be carried out by using a Vickers indenter, but the vertex angle of a Vickers indenter was 136° i.e. an obtuse angle as compared with the angle distribution of the actual sand. Therefore, the present inventors have considered that the superiority against cracking should be determined by using an indenter having a shaper angle. That is, it is considered that in order to judge the superiority against cracking of a cover glass, the cover glass is desired which is less susceptible to breakage when contacted with a substance having such a shaper angle.

Advantageous Effects of Invention

According to the present invention, it is possible to obtain glass for chemical tempering, of which the strength can be sufficiently improved by chemical tempering and which, when used as chemically tempered glass, is less susceptible to cracking which starts from indentations formed.

Further, it is possible to obtain chemically tempered glass, which is less susceptible to breakage even when a load such as an impact or static load is exerted to the glass, since the strength of the glass is less likely to deteriorate even when indentations are formed, and to obtain glass for chemical tempering suitable for such chemically tempered glass.

Further, it is possible to obtain a display device such as a mobile device, a touch panel or a flat screen television, wherein such chemically tempered glass is used as a glass plate for a display device, such as a cover glass.

DESCRIPTION OF EMBODIMENTS

Figure 1:
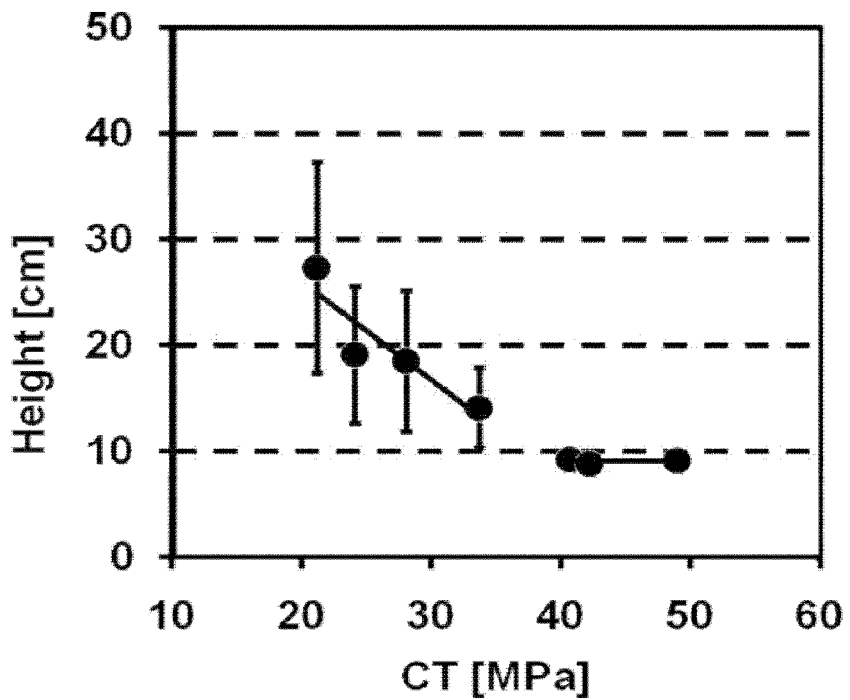
FIG. 1 is a graph showing the relation between the internal tensile stress and the impact failure height in a sand paper drop test.
Figure 2:
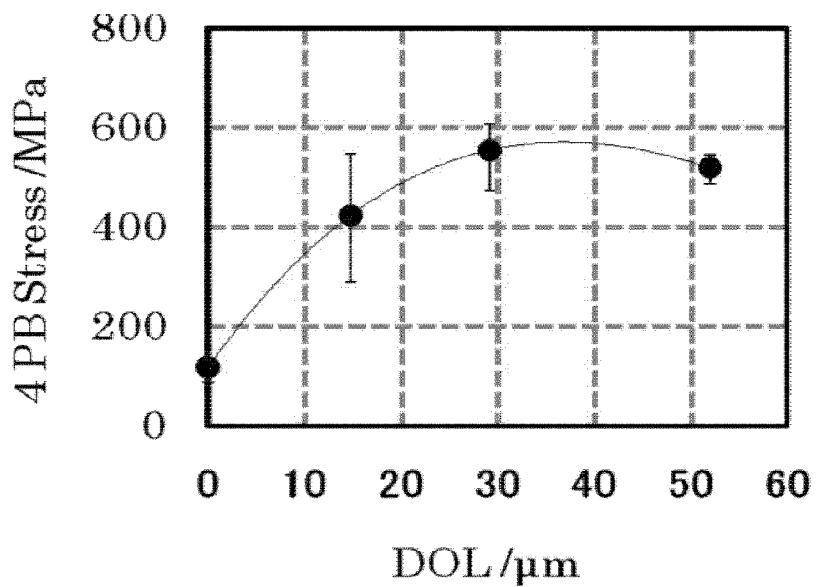
FIG. 2 is a graph showing the relation between the thickness of the compressive stress layer and the four point bending fracture stress.
Figure 3:
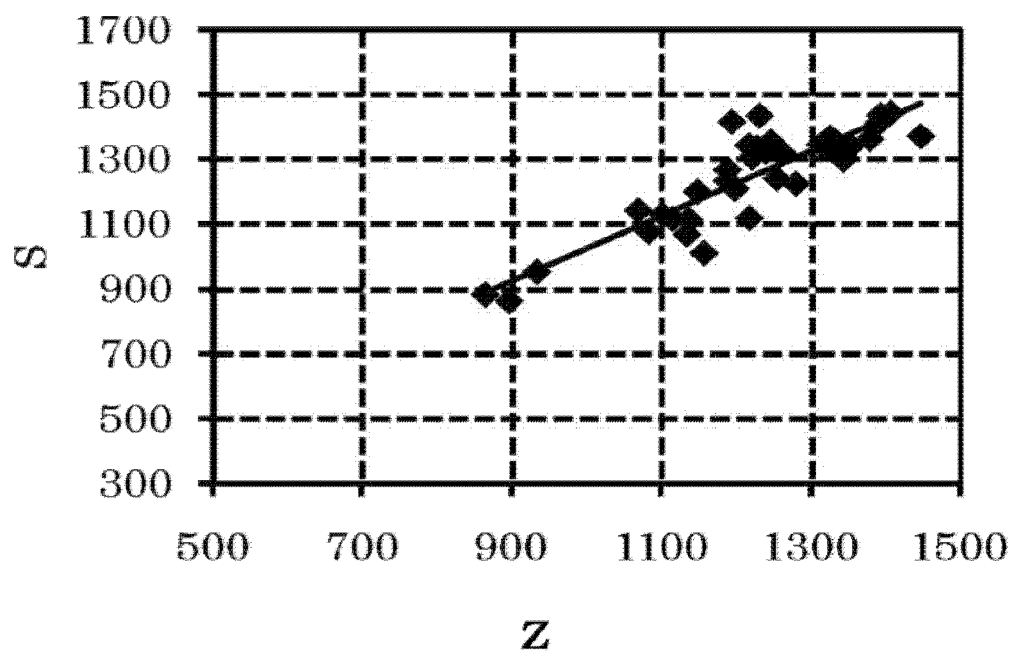
FIG. 3 is a graph showing the relation between the above Z and the surface compressive stress.
Figure 4:
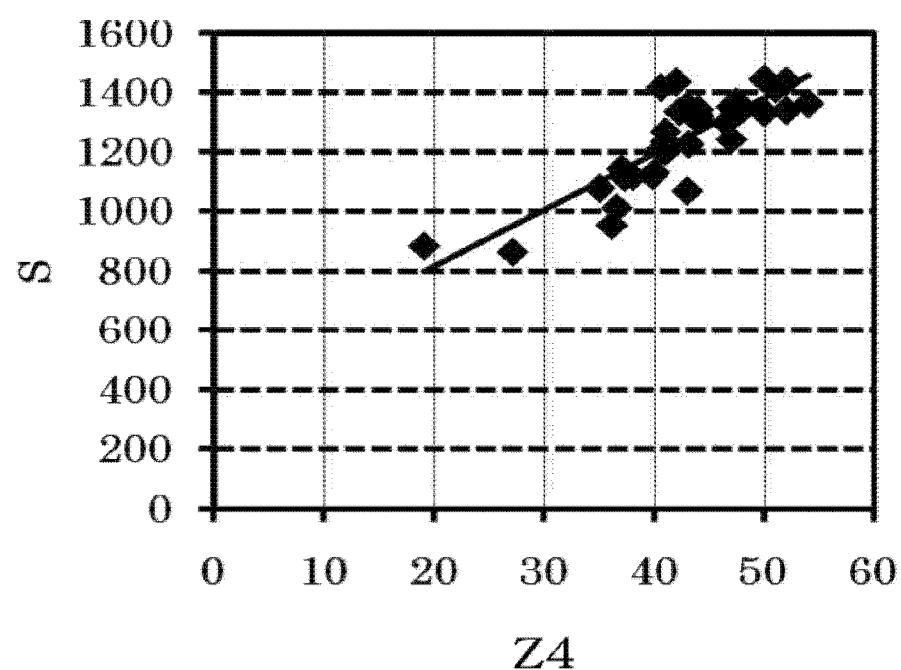
FIG. 4 is a graph showing the relation between the above Z4 and the surface compressive stress.
Figure 5:
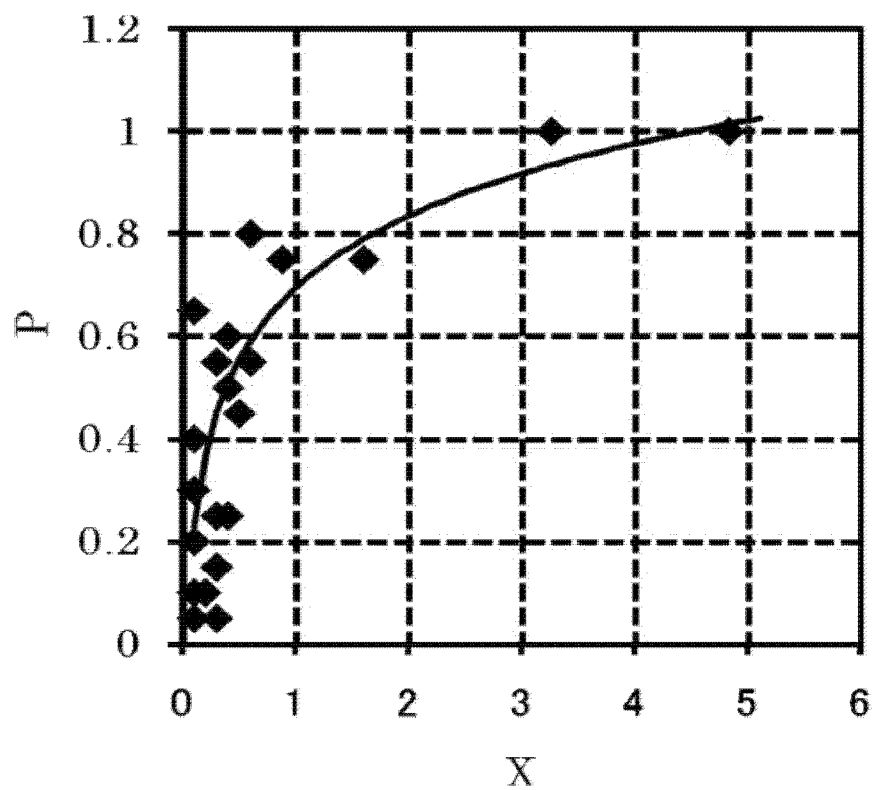
FIG. 5 is a graph showing the relation between the above X and the cracking probability.
Figure 6:
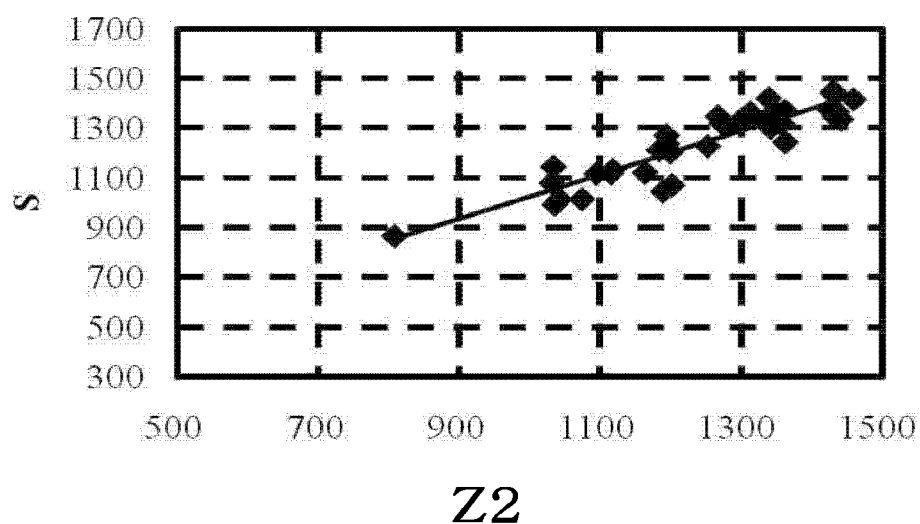
FIG. 6 is a graph showing the relation between the above Z2 and the surface compressive stress.
Figure 7:
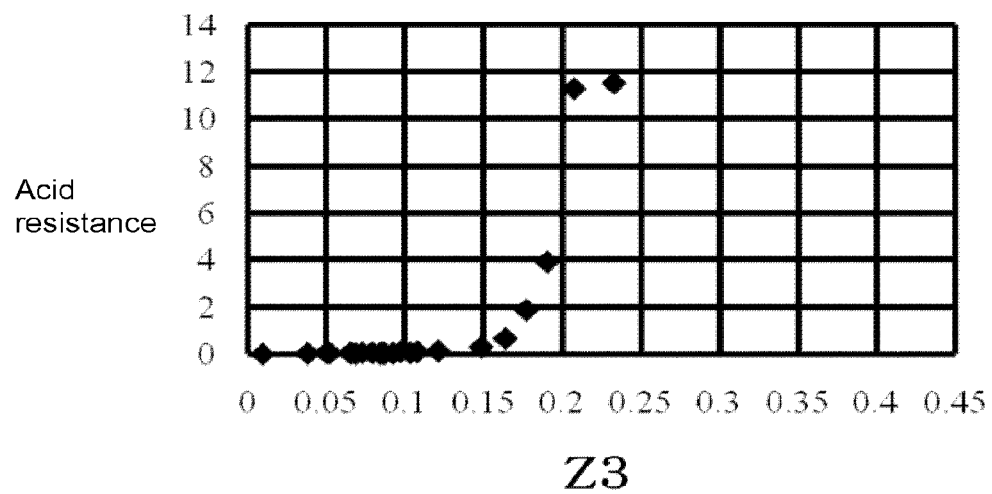
FIG. 7 is a graph showing the relation between the above Z3 and the acid resistance index.
Figure 8:
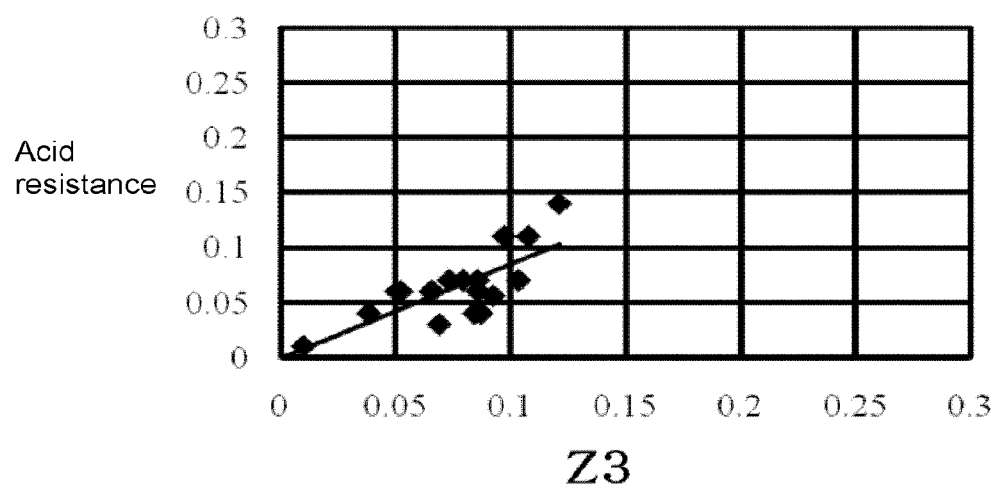
FIG. 8 is an enlarged view of the vicinity of the origin in FIG. 7.

Each of the chemically tempered glass and the glass plate for a display device of the present invention is one obtainable by chemically tempering glass for chemical tempering of the present invention, and will hereinafter be generally referred to as the tempered glass of the present invention.

To be used for e.g. a display device, the surface compressive stress S of the tempered glass of the present invention is preferably at least 800 MPa, more preferably at least 900 MPa, particularly preferably at least 1,000 MPa. S may be at least 1,300 MPa. Further, in a case where the thickness of the glass is less than 2 mm, S is preferably at most 1,600 MPa. If S exceeds 1,600 MPa, the internal tensile stress tends to be too large.

To be used for e.g. a display device, the thickness t of the compressive stress layer of the tempered glass of the present invention is preferably more than 10 μm, more preferably more than 15 μm, typically more than 20 μm or at least 30 μm. Further, in a case where the thickness is less than 2 mm, t is preferably at most 90 μm. If t exceeds 90 μm, the internal tensile stress tends to be too large. More preferably, t is at most 80 μm, typically at most 70 μm.

The method for chemical tempering treatment to obtain the tempered glass of the present invention is not particularly limited so long as it is capable of ion-exchanging Na in the glass surface layer with K in the molten salt, and for example, a method of immersing the glass in a heated potassium nitrate molten salt may be mentioned. Here, in the present invention, a potassium nitrate molten salt or a potassium nitrate salt includes not only $KNO_3$ but also one containing $KNO_3$ and at most 10 mass % of $NaNO_3$.

The conditions for chemical tempering treatment to form a chemically tempered layer (compressive stress layer) having a desired surface compressive stress in glass vary also depending upon e.g. the thickness in the case of a glass plate, but it is typical that a glass substrate is immersed in a potassium nitrate molten salt of from 350 to 550° C. for from 2 to 20 hours. From an economical viewpoint, the immersion is preferably conducted under conditions of from 350 to 500° C. for from 2 to 16 hours, and the immersion time is more preferably from 2 to 10 hours.

The chemically tempered glass of the present invention, particularly the glass plate for a display device of the present invention, is preferably such that no cracking takes place i.e. the breakage rate is 0, even when a force of 0.1 kgf=0.98N is exerted thereto by a test by means of a Vickers hardness meter having a pyramid-shaped diamond indenter with a vertex angle of 110° mounted.

Further, it is preferred that the breakage rate is less than 1 even when a force of 0.2 kgf=1.96N is exerted, and it is more preferred that the breakage rate is at most 0.8 when a force of 1.96N is exerted.

The glass plate for a display device of the present invention is usually obtainable by chemically tempering a glass plate obtained by subjecting a glass plate made of glass for chemical tempering of the present invention to processing by cutting, drilling, polishing, etc.

The thickness of the glass plate for a display device of the present invention is usually from 0.3 to 2 mm, typically at most 1.5 mm.

The glass plate for a display device of the present invention is typically a cover glass.

The method for producing a glass plate made of the above glass for chemical tempering is not particularly limited. For example, it is produced by mixing various raw materials in proper amounts, heating and melting the mixture at from about 1,400 to 1,800° C. and homogenizing the melt by defoaming, stirring, etc., forming it into a plate by a well-known float process, down draw process, pressing process, or the like, annealing it and then cutting it in a desired size.

The glass transition temperature of glass for chemical tempering of the present invention i.e. the glass of the present invention, is preferably at least 400° C. If it is less than 400° C., the surface compressive strain tends to be relaxed at the time of ion exchange, whereby no adequate stress may be obtainable. It is more preferably at least 550° C.

The temperature T2 at which the viscosity of the glass of the present invention becomes $10^2$ dPa·s, is preferably at most 1,800° C., more preferably at most 1,750° C.

The temperature T4 at which the viscosity of the glass of the present invention becomes $10^4$ dPa·s, is preferably at most 1,350° C.

The liquid phase temperature of the glass of the present invention is preferably lower than T4, more preferably lower by at least 20° C. than T4, with a view to preventing devitrification during formation of the glass.

The specific gravity p of the glass of the present invention is preferably from 2.43 to 2.49.

The Young's modulus of the glass of the present invention is preferably at least 68 GPa. If it is less than 68 GPa, the cracking resistance or fracture strength of the glass is likely to be inadequate.

The Poisson's ratio σ of the glass of the present invention is preferably at most 0.25 . If it exceeds 0.25, the cracking resistance of the glass is likely to be inadequate.

Now, the composition of the glass of the present invention and glass A will be described by using contents represented by mole percentage unless otherwise specified.

$SiO_2$ is an essential component to constitute a glass matrix and also is a component to reduce cracking when a flaw (an indentation) is formed on the glass surface, or to reduce the breakage rate when an indentation is imparted after chemical tempering. If the $SiO_2$ content is less than 56%, the stability, acid resistance, weather resistance or chipping resistance, as glass, tends to be low. $SiO_2$ is preferably at least 58%, more preferably at least 60%. If $SiO_2$ exceeds 73%, the viscosity of the glass tends to increase, whereby the melting property of the glass tends to be low, or it tends to be difficult to increase the surface compressive stress. $SiO_2$ is preferably at most 72%, more preferably at most 69%, and in glass A, it is at most 69%.

$Al_2O_3$ is a component effective to improve the ion exchange performance and the chipping resistance, a component to increase the surface compressive stress, or an essential component to reduce cracking when an indentation is imparted by a 110° indenter. If $Al_2O_3$ is less than 6%, it tends to be difficult to obtain the desired surface compressive stress value or compressive stress layer thickness by ion exchange. $Al_2O_3$ is preferably at least 8%, more preferably at least 9%. If $Al_2O_3$ exceeds 20%, the viscosity of the glass tends to be high, whereby uniform melting tends to be difficult, or the acid resistance tends to be low. $Al_2O_3$ is preferably at most 16%, more preferably at most 15%, typically at most 14%, and in glass A, it is preferably at most 16%.

The total content of $SiO_2$ and $Al_2O_3$ i.e. $SiO_2+Al_2O_3$ is preferably at most 80%. If the total content exceeds 80%, the viscosity of the glass tends to increase at a high temperature, whereby melting tends to be difficult, and it is preferably at most 79%, more preferably at most 78%. Further, $SiO_2+Al_2O_3$ is preferably at least 70%. If it is less than 70%, the cracking resistance when an indentation is imparted, tends to be low, and it is more preferably at least 72%.

$Na_2O$ is an essential component to form a surface compressive stress layer by ion exchange and to improve the melting property of the glass. If $Na_2O$ is less than 9%, it tends to be difficult to form a desired surface compressive stress layer by ion exchange, and it is preferably at least 10%, more preferably at least 10.5% or at least 11%. If $Na_2O$ exceeds 25%, the weather resistance or acid resistance tends to decrease, or cracking is likely to start from an indentation. It is preferably at most 22%, more preferably at most 21%, and in glass A, it is at most 22%. In a case where it is desired to improve the acid resistance, $Na_2O$ is preferably at most 17%, more preferably at most 16.5%.

$K_2O$ is not essential but is a component to increase the ion exchange rate, and thus, it may be contained up to 2%. If it exceeds 2%, cracking tends to start from an indentation, or a change in the surface compressive stress due to the concentration of $NaNO_3$ in the potassium nitrate molten salt tends to be large. $K_2O$ is preferably less than 2%, more preferably at most 1%, further preferably at most 0.8%, particularly preferably at most 0.5%, typically at most 0.3%, and in glass A, it is at most 1%. In a case where it is desired to reduce the change in the surface compressive stress due to the concentration of $NaNO_3$ in the potassium nitrate molten salt, $K_2O$ should better be not contained.

MgO is not essential, but is a component to increase the surface compressive stress and to improve the melting property. In a case where MgO is contained, its content is preferably at least 5.5%, more preferably at least 7%. In glass A, MgO is essential and is at least 5.5%, preferably at least 7%. In a case where it is desired to prevent stress relaxation, MgO is preferably at least 8%. If MgO is less than 8%, the degree of stress relaxation tends to vary depending upon the location in the chemical tempering treatment tank due to a fluctuation of the temperature of the molten salt during the chemical tempering treatment, and consequently, it is likely to be difficult to obtain a stabilized compressive stress value. On the other hand, if MgO exceeds 15%, the glass is likely to undergo devitrification, or a change in the surface compressive stress due to the concentration of $NaNO_3$ in the potassium nitrate molten salt tends to be large, and it is preferably at most 14%, more preferably at most 13%. In glass A, it is at most 14%.

The difference ($SiO_2$–MgO) obtained by subtracting the content of MgO from the content of $SiO_2$ is preferably at most 64%, more preferably at most 62%, typically at most 61%.

The difference ($Al_2O_3$–MgO) obtained by subtracting the content of MgO from the content of $Al_2O_3$ is preferably at most 9%, more preferably at most 8%.

The total content of $SiO_2$, $Al_2O_3$, $Na_2O$ and MgO is preferably at least 98%. If the total content is less than 98%, it tends to be difficult to obtain the desired compressive stress layer while maintaining the cracking resistance. It is typically at least 98.3%.

In a case where it is desired to increase the surface compressive stress and at the same time to improve the acid resistance, for example in a case where it is desired to make the above S to be at least 1,150 MPa and the above W to be at most 0.15 mg/cm², it is preferred that $SiO_2$ is from 62 to 66%, $Al_2O_3$ is from 10.5 to 13%, $Na_2O$ is from 14 to 17% and MgO is from 6 to 9%, and the total content of these components is more preferably at least 97%.

In a case where it is desired to more increase the surface compressive stress and at the same time to more improve the acid resistance, for example in a case where it is desired to make the above S to be at least 1,300 MPa and the above W to be at most 0.1 mg/cm², it is preferred that $SiO_2$ is from 63 to 66%, $Al_2O_3$ is from 10.5 to 13%, $Na_2O$ is from 14 to 17%, MgO is from 6 to 9% and $ZrO_2$ is from 0.2 to 2%, and the total content of these components is more preferably at least 97.5%.

The glass of the present invention consists essentially of the above-described components, but may contain other components within a range not to impair the purpose of the present invention. In a case where such other components are contained, the total content of such other components is preferably at most 5%, more preferably at most 2%, typically at most 1%.

$ZrO_2$ is not essential, but may be contained within a range of up to 2% in order to lower the viscosity at a high temperature or to increase the surface compressive stress, or to improve the acid resistance, and in a case where it is contained for the purpose of increasing the surface compressive stress, its content is preferably at least 0.2%, for example at least 0.5% or more than 0.5%. If $ZrO_2$ exceeds 2%, the possibility of cracking to start from an indentation may increase. In a case where it is desired to prevent cracking, $ZrO_2$ is preferably at most 1%, more preferably at most 0.5%, or typically no $ZrO_2$ is contained.

$B_2O_3$ is not essential but may be contained within a range of at most 6% in order to improve the melting property of glass at a high temperature or to improve the glass strength. If $B_2O_3$ exceeds 6%, homogeneous glass tends to be hardly obtainable, and the glass forming may be difficult, or the cracking resistance may deteriorate. Typically no $B_2O_3$ is contained.

The total content of $SiO_2$, $Al_2O_3$, $Na_2O$ and MgO is preferably at least 98%.

The above Z is preferably at least 1,000, more preferably at least 1,050, typically at least 1,100.

The above Z4 is preferably at least 35, more preferably at least 38.

The above X is preferably at most 1, more preferably at most 0.8.

The above Y1 is preferably less than −600, more preferably at most −650.

The above Y2 is preferably less than −245, more preferably at most −260.

The difference ($Na_2O$—$Al_2O_3$) obtained by subtracting $Al_2O_3$ from the content of $Na_2O$ is preferably less than 5%.

The above R is preferably at least −100, more preferably at least −70.

Glass A of the present invention consists essentially of the above-described components, but may contain other components within a range not to impair the object of the present invention. In a case where such other components are contained, the total content of such components is preferably less than 2%, more preferably at most 1%. Now, such other components will be exemplified.

ZnO may be contained in a certain case, for example, up to 2% in order to improve the melting property of glass at a high temperature, but preferably at most 1%. In a case of production by a float process, ZnO is preferably at most 0.5%. If ZnO exceeds 0.5%, it is likely to be reduced during the float forming to form a product defect. Typically, no ZnO is contained.

$TiO_2$ is likely to deteriorate the visible light transmittance and likely to color glass to be brown when it is coexistent with Fe ions in the glass, and therefore, its content is preferably at most 1% if contained, and typically, it is not contained.

$Li_2O$ is a component to lower the strain point and to bring about a stress relaxation thereby to make it difficult to obtain a stable surface compressive stress layer and therefore it is preferably not contained, and even if contained, its content is preferably less than 1%, more preferably at most 0.05%, particularly preferably less than 0.01%.

Further, $Li_2O$ may elute into a molten salt of e.g. $KNO_3$ during chemical tempering treatment, and if chemical tempering is carried out by using the molten salt containing Li, the surface compressive stress decreases remarkably. From this viewpoint, $Li_2O$ is preferably not contained.

CaO may be contained in a range of less than 1% in order to improve the melting property at a high temperature or to prevent devitrification. If CaO is 1% or more, the ion exchange rate or the resistance against cracking tends to be low. Typically, no CaO is contained.

SrO may be contained as the case requires, but it has a large effect to lower the ion exchange rate as compared with MgO or CaO, and therefore, even if it is contained, its content should preferably be less than 1%. Typically, no SrO is contained.

BaO has the largest effect to lower the ion exchange rate among alkaline earth metal oxides, and therefore, it is preferred that no BaO is contained, or even if contained, its content is less than 1%.

When SrO and/or BaO is contained, their total content should preferably be at most 1%, more preferably less than 0.3%.

When at least one member of CaO, SrO, BaO and ZrO is contained, the total content of these four components should preferably be less than 1.5%. If the total content is 1.5% or more, the ion exchange rate is likely to be low, and typically, the total content is at most 1%.

As a clarifying agent at the time of melting glass, $SO_3$, a chloride, a fluoride or the like may suitably be contained. However, in order to increase the visibility of display devices such as touch panels, it is preferred to reduce components which may be included as impurities in raw materials such as $Fe_2O_3$, NiO, $Cr_2O_3$, etc. having an absorption in a visible light range as far as possible, and the content of each of them is preferably at most 0.15%, more preferably at most 0.05%, as represented by mass percentage.

EXAMPLES

With respect to Ex. 1 to 21, 25, 29, 30, 31 to 48 and 52 to 56 in Tables, glass raw materials commonly used, such as oxides, hydroxides, carbonates, nitrates, etc., were suitably selected to have a composition as represented by mol % in columns for $SiO_2$ to $K_2O$, and weighed so that they became 400 g as glass. To the weighed raw materials, sodium sulfate was added in an amount by mass corresponding to 0.2% of the mass thereof, followed by mixing. Then, the mixed raw materials were put into a platinum crucible and melted, defoamed and homogenized in a resistance heating type electric furnace at a temperature of 1,650° C. for 6 hours. The obtained molten glass was cast into a mold material, held at a temperature of Tg+50° C. for one hour and then cooled to room temperature at a rate of 0.5° C./min to obtain a glass block.

Further, Ex. 49 is soda lime glass separately prepared, and in Ex. 22 to 24, 32 and 33, melting of glass as described above was not carried out. Further, in Tables, data identified with * are ones obtained by calculation or assumption from the compositions.

Ex. 1 to 47 and 52 to 56 are Examples for chemically tempered glass of the present invention, Ex. 48 is a Reference Example, Ex. 49 to 51 are Comparative Examples, and Ex. 1 to 25, 29 to 46, and 52 to 56 are Examples for glass A of the present invention.

Further, in Tables, values of the above Z are shown which were calculated by using the contents, as represented by mole percentage, of the respective components such as $SiO_2$, etc. For example, in the calculation of Z in Ex. 1 (the $SiO_2$ content of glass was 64 mol %), $SiO_2$ was taken as 64.

Further, in Tables, values of the above Z2, Z3, Z4 and X are shown.

With respect to these glasses, the Young's modulus E (unit: GPa), the specific gravity d, the glass transition point Tg (unit: ° C.), the temperature T2 (unit: ° C.) at which the viscosity becomes to be $10^2$ dPa·s, the temperature T4 (unit: ° C.) at which the viscosity becomes to be $10^4$ dPa·s, the liquid phase temperature TL (unit: ° C.), the average linear expansion coefficient a (unit: $^{-7}$/° C.) at from 50 to 350° C., the acid resistance (unit: mg/cm$^2$) and the cracking probability P are shown in Tables. Here, in Tables, "-" indicates that no measurement or calculation was made, and "*" indicates that the calculation was made from the glass composition, etc.

The acid resistance was measured as follows. That is, the glass block was cut, ground and finally processed to have both surfaces mirror-polished to obtain a plate glass having a size of 40 mm×40 mm and a thickness of from 1.0 mm to 1.3 mm. The process up to the mirror polishing was such that glass in a plate-form was ground for 300 to 1,000 pm by means of a grinding stone of #1,000 to obtain a plate glass, which was then polished by means of cerium oxide to have its surfaces mirror-polished. The obtained plate glass was immersed in 0.1 mol/l hydrochloric acid warmed to 90° C. for 20 hours, whereby the mass decrease as between before and after the immersion was measured, and it was divided by the plate glass surface area to calculate the acid resistance.

The glass block was cut, ground and finally processed to have both surfaces mirror-polished to obtain a plate glass having a size of 30 mm×30 mm and a thickness of 1.0 mm and 3.0 mm. The process up to the mirror polishing was such that glass in a plate-form was ground for 300 to 1,000 μm by means of a grinding stone of #1,000 to obtain a plate glass, which was then polished by means of cerium oxide to have its surfaces mirror-polished.

The liquid phase temperature was measured as follows. That is, 10 g of glass having a size of from about 1 to 4 mm was placed on a platinum dish, melted in an electric furnace maintained at a constant temperature for at least 17 hours and then taken out, whereupon the glass was quenched at room temperature. This glass sample was observed by a polarized-light microscope to confirm the presence or absence of crystals thereby to obtain a temperature at which crystals were confirmed and a temperature at which no crystals were confirmed. The result is shown in such a form that these two temperatures are connected by "-", and the liquid phase temperature is present between these two temperatures. Further, in Ex. 55 and 56, the presence or absence of crystals was confirmed only at 1,250° C., whereby crystals were confirmed at that temperature, and therefore, the liquid phase temperature was found to be higher than 1,250° C.

Then, with respect to plate glasses in Ex. 1, 3, 5 to 7, 11 to 24, 29 to 49 and 52 to 56, the following chemical tempering treatment was carried out. That is, each of these glasses was immersed for 10 hours in a $KNO_3$ molten salt of 425° C. to carry out the chemical tempering treatment. Here, in the $KNO_3$ molten salt, the $KNO_3$ content was from 99.7 to 100 mass %, and the $NaNO_3$ content was from 0 to 0.3 mass %.

With respect to each glass after the chemical tempering treatment, the surface compressive stress S (unit: MPa) and the compressive stress layer depth t (unit: μm) were measured by means of a surface stress meter FSM-6000 manufactured by Orihara Manufacturing Co., Ltd. The results are shown in the corresponding columns in Tables.

Further, each of glasses in Ex. 1 to 10, 12 to 20 and 21 to 51 was immersed for 2 hours in a $KNO_3$ molten salt of 425° C., and glass in Ex. 11 was immersed for 1 hour in a $KNO_3$ molten salt of 425° C., whereupon the surface compressive stress, the compressive stress layer depth and the internal tensile stress calculated from these values are shown in the columns for CS (unit: MPa), DOL (unit: μm) and CT (unit: MPa), respectively, in Tables.

Separately, with respect to plate glasses in Ex. 1, 3, 5 to 7, 11 to 24 and 47 to 49, the following chemical tempering treatment was carried out. That is, each of these glasses was immersed in a molten salt of 450° C. having a $KNO_3$ content of 95 mass % and a $NaNO_3$ content of 5 mass % to carry out chemical tempering treatment.

With respect to each glass after the chemical tempering treatment, the surface compressive stress and the compressive stress layer depth were measured. The results are shown in the columns for CS for P (unit: MPa) and DOL for P (unit: μm) in Tables.

By using such a sample subjected to the chemical tempering treatment at 450° C., the cracking probability P was measured when a load of 200 gf (=1.96N) was exerted by means of a Vickers hardness meter using a pyramid-shaped diamond indenter with a vertex angle of 110°. That is, under conditions of a temperature of 24° C. and a dew point of from 35 to 45° C. in the atmosphere, the Vickers indenter was pressed at 10 points with a load of the Vickers hardness meter adjusted to 200 g, whereby the number of cracks formed at the four corners of indentations was measured. One obtained by dividing this number of cracks formed, by 40 i.e. the possible number of cracks expected, was taken as the cracking probability P. Here, P in Ex. 22 to 25, 28, 50 and 51 is one when the thickness is 3.0 mm, CS for P is 800 MPa and DOL for P is 45 μm.

The lower the cracking probability P, the better. Specifically, P is preferably at most 0.80. With glasses in working Examples of the present invention, P does not exceed 0.80, thus indicating that cracking is less likely to occur.

Further, when CT is the same, P becomes small when CS is large. The reason is as follows. That is, when a pyramid-shaped diamond indenter with a vertex angle of 110° is pressed against the glass, cracks will be formed in a direction perpendicular to the pressing direction. An internal tensile stress will work as a force to tear the formed cracks and to break the glass, and therefore, if cracks are formed in glass having a large CT, the glass tends to undergo breakage. On the other hand, if CT is the same, glass having a larger CS working against the tearing force of the internal tensile stress, tends to be less likely to break.

Further, when CT is small, P becomes small. The reason is as follows. That is, cracks formed by pressing of the pyramid-shaped diamond indenter are mainly of a type extending in a perpendicular direction from the surface, and therefore, such cracking is attributable to a stress distribution formed by elastic deformation during the pressing. Therefore, with respect to a tempered glass, the surface compressive stress and the tensile stress distributed in the thickness direction are influential over its cracking, and particularly the stress site due to elastic deformation is widely distributed in the thickness direction, and therefore, the influence of the tensile stress layer formed in a wide region is substantial.

With respect to glasses in Ex. 12, 17 and 49 after the chemical tempering treatment, the acid resistance was measured as described above and found to be 12.35, 0.04 and 0.02 $mg/cm^2$, respectively. When these data are compared with the acid resistance data before the chemical tempering treatment in Tables 2 and 6, there is a positive correlation between the two, and it is evident that the acid resistance after the chemical tempering treatment becomes 1.02 times the acid resistance before the chemical tempering treatment.

TABLE 1

| | Ex. | | | | | | | | | |
|---|---|---|---|---|---|---|---|---|---|---|
| | 1 | 2 | 3 | 4 | 5 | 6 | 7 | 8 | 9 | 10 |
| $SiO_2$ | 64 | 62 | 64 | 62 | 60 | 62 | 60 | 58 | 60 | 60 |
| $Al_2O_3$ | 12 | 14 | 14 | 12 | 14 | 14 | 12 | 14 | 14 | 12 |
| $B_2O_3$ | 0 | 0 | 0 | 0 | 0 | 0 | 0 | 0 | 0 | 0 |
| MgO | 8 | 8 | 8 | 10 | 10 | 10 | 12 | 12 | 12 | 8 |
| CaO | 0 | 0 | 0 | 0 | 0 | 0 | 0 | 0 | 0 | 0 |
| $ZrO_2$ | 0 | 0 | 0 | 0 | 0 | 0 | 0 | 0 | 0 | 0 |
| $Na_2O$ | 16 | 16 | 14 | 16 | 16 | 14 | 16 | 16 | 14 | 20 |
| $K_2O$ | 0 | 0 | 0 | 0 | 0 | 0 | 0 | 0 | 0 | 0 |
| E | 72 | 75 | 75 | 74 | 75 | 75 | 75 | 77 | 78* | 72 |
| d | 2.46 | 2.47 | 2.46 | 2.47 | 2.48 | 2.47 | 2.49 | 2.49 | 2.49* | 2.48 |
| Tg | 659* | 689* | 724* | 661* | 691* | 726* | 663* | 693* | 728* | 589* |
| T2 | 1657* | 1691* | 1783* | 1611* | 1645* | 1737* | 1565 | 1598 | 1691 | 1473* |
| T4 | 1242* | 1292* | 1370* | 1221* | 1271* | 1349* | 1200 | 1250 | 1328 | 1086* |
| TL | — | — | — | — | — | — | — | — | — | — |
| α | 87* | 87* | 80* | 88* | 89* | 82* | 90* | 90* | 83* | 100* |
| Acid resistance | 0.12* | 0.19* | 0.14* | 0.14* | 0.21* | 0.16* | 0.16* | 0.23* | 0.19* | 0.21* |
| S | 1321 | 1431* | 1334 | 1374* | 1439 | 1341 | 1346 | 1287* | 1364 | 1343* |
| t | 41 | 42* | 43 | 42* | 34 | 31 | 26 | 24* | 25 | 40* |
| CS | 1400 | 1512 | 1393 | 1448 | 1514 | 1419 | 1400* | 1338* | 1419* | 1397* |
| DOL | 18 | 17 | 17 | 16 | 15 | 14 | 12* | 11* | 11* | 18* |
| CT | 27 | 27 | 24 | 23 | 23 | 21 | 17* | 15* | 16* | 26* |
| CS for P | 924 | 954 | 890 | 916 | 923 | 892 | 883 | 858 | 909 | 895 |
| DOL for P | 43 | 41 | 45 | 43 | 41 | 43 | 44 | 44 | 42 | 30 |
| P | 0.15 | 0.2 | 0.05 | 0.05 | 0.1 | 0.1 | 0.55 | 0.3 | 0.3 | 0.25 |
| Z | 1260 | 1366 | 1326 | 1286 | 1392 | 1352 | 1312 | 1418 | 1378 | 1340 |
| Z2 | 1273 | 1436 | 1441 | 1270 | 1433 | 1438 | 1267 | 1430 | 1435 | 1262 |
| Z3 | 0.121 | 0.188 | 0.144 | 0.143 | 0.210 | 0.166 | 0.164 | 0.231 | 0.187 | 0.210 |
| Z4 | 44 | 50 | 50 | 46 | 52 | 52 | 48 | 54 | 54 | 44 |
| X | 0.3 | 0.1 | 0.1 | 0.3 | 0.1 | 0.1 | 0.3 | 0.1 | 0.1 | 0.3 |

TABLE 2

| | Ex. | | | | | | | | | |
|---|---|---|---|---|---|---|---|---|---|---|
| | 11 | 12 | 13 | 14 | 15 | 16 | 17 | 18 | 19 | 20 |
| $SiO_2$ | 58 | 60 | 66 | 66 | 66 | 68 | 68 | 68 | 68 | 68 |
| $Al_2O_3$ | 14 | 14 | 11 | 12 | 13 | 9 | 10 | 11 | 9 | 10 |
| $B_2O_3$ | 0 | 0 | 0 | 0 | 0 | 0 | 0 | 0 | 0 | 0 |
| MgO | 8 | 8 | 8 | 8 | 8 | 8 | 8 | 8 | 10 | 10 |
| CaO | 0 | 0 | 0 | 0 | 0 | 0 | 0 | 0 | 0 | 0 |
| $ZrO_2$ | 0 | 0 | 0 | 0 | 0 | 0 | 0 | 0 | 0 | 0 |
| $Na_2O$ | 20 | 18 | 15 | 14 | 13 | 15 | 14 | 13 | 13 | 12 |
| $K_2O$ | 0 | 0 | 0 | 0 | 0 | 0 | 0 | 0 | 0 | 0 |
| E | 73 | 73 | 72 | 73 | 75 | 71 | 72 | 73 | 73 | 74 |
| d | 2.49 | 2.48 | 2.45 | 2.45 | 2.45 | 2.44 | 2.44 | 2.43 | 2.44 | 2.44 |
| Tg | 619* | 654* | 662* | 694* | 727* | 632* | 665* | 697* | 669* | 702* |
| T2 | 1507* | 1645 | 1687* | 1750* | 1812* | 1687* | 1716 | 1779* | 1699* | 1762* |
| T4 | 1136* | 1227 | 1255* | 1319* | 1384* | 1225* | 1263 | 1333* | 1261* | 1326* |
| TL | — | 1200-1220 | — | — | — | — | 1220-1230 | — | — | — |
| α | 101* | 94* | 83* | 80* | 77* | 82* | 79* | 76* | 77* | 74* |
| Acid resistance | 0.28* | 11.54 | 0.06* | 0.08* | 0.09* | 0* | 0.01 | 0.02* | 0* | 0* |
| S | 1373 | 1446 | 1269 | 1307 | 1242 | 1078 | 1117 | 1201 | 1143 | 1131 |
| t | 46 | 42 | 40 | 40 | 38 | 44 | 42 | 40 | 34 | 33 |
| CS | 1524 | 1530 | 1324 | 1355 | 1352 | 1165 | 1248 | 1272 | 1198 | 1182 |
| DOL | 10 | 13 | 18 | 18 | 17 | 20 | 18 | 18 | 15 | 15 |
| CT | 16 | 20 | 25 | 25 | 23 | 19 | 23 | 24 | 19 | 18 |
| CS for P | 929 | 968 | 894 | 903 | 875 | 827 | 858 | 847 | 811 | 800 |
| DOL for P | 42 | 45 | 44 | 43 | 45 | 46 | 44 | 42 | 41 | 40 |
| P | 0.65 | 0.4 | 0.25 | 0.15 | 0.1 | 0.8 | 0.45 | 0.5 | 0.55 | 0.45 |
| Z | 1446 | 1406 | 1187 | 1220 | 1253 | 1081 | 1114 | 1147 | 1067 | 1100 |
| Z2 | 1425 | 1430 | 1194 | 1278 | 1362 | 1031 | 1115 | 1199 | 1033 | 1118 |
| Z3 | 0.277 | 0.233 | 0.065 | 0.077 | 0.088 | −0.002 | 0.010 | 0.021 | −0.025 | −0.013 |
| Z4 | 50 | 50 | 41 | 44 | 47 | 35 | 38 | 41 | 37 | 40 |
| X | 0.1 | 0.1 | 0.4 | 0.3 | 0.2 | 0.6 | 0.5 | 0.4 | 0.6 | 0.5 |

TABLE 3

| | Ex. | | | | | | | | | |
|---|---|---|---|---|---|---|---|---|---|---|
| | 21 | 22 | 23 | 24 | 25 | 26 | 27 | 28 | 29 | 30 |
| $SiO_2$ | 68 | 61 | 60 | 58 | 55 | 63 | 70 | 65 | 66 | 64 |
| $Al_2O_3$ | 11 | 15 | 15 | 15 | 20 | 14 | 9 | 15 | 11 | 12 |
| $B_2O_3$ | 0 | 1 | 3 | 5 | 0 | 7.4 | 0 | 0 | 0 | 0 |
| MgO | 10 | 8 | 7 | 7 | 10 | 0.1 | 7 | 5 | 8 | 8 |
| CaO | 0 | 0 | 0 | 0 | 0 | 0.1 | 0 | 0 | 0 | 0 |
| $ZrO_2$ | 0 | 0 | 0 | 0 | 0 | 0 | 0 | 0 | 0 | 0 |
| $Na_2O$ | 11 | 15 | 15 | 15 | 15 | 15 | 14 | 15 | 15 | 16 |
| $K_2O$ | 0 | 0 | 0 | 0 | 0 | 0.6 | 0 | 0 | 0 | 0 |
| E | 75 | 80* | 78* | 76* | 79* | 64 | 72 | 78* | 76 | 77 |
| d | 2.44 | 2.47* | 2.46* | 2.46* | 2.50* | 2.38 | 2.42 | 2.45* | 2.45 | 2.47 |
| Tg | 734* | 716* | 704* | 693* | 696* | 628 | 649 | 719* | 662 | 659 |
| T2 | 1825* | 1734* | 1717* | 1677* | 1791* | 1932 | 1723 | 1823* | 1707 | 1677 |
| T4 | 1390* | 1344* | 1331* | 1307* | 1462* | 1426 | 1254 | 1388* | 1285 | 1272 |
| TL | — | — | — | — | — | — | — | — | — | — |
| α | 71* | 83* | 82* | 81* | 82* | 79 | 78 | 82* | 83 | 87 |
| Acid resistance | 0* | 0.21* | 0.21* | 0.22* | 0.39* | 0.14* | 0* | 0.17* | 0.06 | 0.14 |
| S | 1069 | 1318* | 1244* | 1175* | 1348* | 954 | 991 | 1398* | 1235 | 1317 |
| t | 33 | 38* | 34* | 25* | 19* | 44 | 47 | 56* | 41 | 43 |
| CS | 1117 | 1371* | 1294* | 1222* | 1402* | 992* | 1031* | 1454* | 1320 | 1399 |
| DOL | 14 | 16* | 20* | 14* | 11* | 25* | 27* | 16* | 20 | 18 |
| CT | 17 | 22* | 26* | 18* | 16* | 27* | 30* | 24* | 27 | 26 |
| CS for P | 773 | — | — | — | — | 954 | 1101 | — | — | — |
| DOL for P | 39 | — | — | — | — | 44 | 33 | — | — | — |
| P | 0.6 | 0* | 0.3* | 0.7* | 1* | 1 | 0.8 | 0.1* | — | — |
| Z | 1133 | 1367 | 1290 | 1226 | 1690 | 932 | 1048 | 1360 | 1187 | 1260 |
| Z2 | 1202 | — | — | — | 1925 | — | 1035 | 1525 | 1194 | 1273 |
| Z3 | −0.002 | — | — | — | 0.389 | — | −0.035 | 0.168 | 0.065 | 0.121 |
| Z4 | 43 | 53 | 52 | 52 | 70 | 36 | 34 | 50 | 41 | 44 |
| X | 0.4 | 0.4 | 1.2 | 2 | −0.5 | 3.26 | 0.6 | 0 | 0.4 | 0.3 |

TABLE 4

| Ex. | 31 | 32 | 33 | 34 | 35 | 36 | 37 | 38 | 39 | 40 |
|---|---|---|---|---|---|---|---|---|---|---|
| $SiO_2$ | 62 | 61.4 | 62.7 | 64.1 | 65.4 | 61.2 | 62.6 | 65.3 | 66.7 | 63.7 |
| $Al_2O_3$ | 13 | 12.9 | 11.8 | 10.7 | 9.6 | 14.3 | 13.1 | 10.9 | 9.8 | 11.4 |

TABLE 4-continued

| Ex. | 31 | 32 | 33 | 34 | 35 | 36 | 37 | 38 | 39 | 40 |
|---|---|---|---|---|---|---|---|---|---|---|
| $B_2O_3$ | 0 | 0 | 0 | 0 | 0 | 0 | 0 | 0 | 0 | 0 |
| MgO | 8 | 7.9 | 7.8 | 7.8 | 7.7 | 8.2 | 8.1 | 7.9 | 7.8 | 8.0 |
| CaO | 0 | 0 | 0 | 0 | 0 | 0 | 0 | 0 | 0 | 0 |
| $ZrO_2$ | 0 | 0 | 0 | 0 | 0 | 0 | 0 | 0 | 0 | 1.0 |
| $Na_2O$ | 17 | 17.8 | 17.6 | 17.5 | 17.3 | 16.3 | 16.2 | 15.8 | 15.7 | 15.9 |
| $K_2O$ | 0 | 0 | 0 | 0 | 0 | 0 | 0 | 0 | 0 | 0 |
| E | 78* | 77* | 76* | 74* | 73* | 80* | 78* | 75* | 74* | 75 |
| d | 2.48* | 2.49* | 2.48* | 2.47* | 2.46* | 2.48* | 2.47* | 2.46* | 2.45* | 2.49 |
| Tg | 657* | 640* | 627* | 614* | 601* | 688* | 673* | 646* | 632* | 667 |
| T2 | 1648* | 1610* | 1601* | 1593* | 1585* | 1697* | 1687* | 1668* | 1659* | 1665 |
| T4 | 1258* | 1223* | 1203* | 1183* | 1163* | 1315* | 1293* | 1250* | 1230* | 1245 |
| TL | — | — | — | — | — | — | — | — | — | 1210-1220 |
| α | 90* | 93* | 92* | 91* | 90* | 88* | 87* | 86* | 85* | 85 |
| Acid resistance | 1.88 | 3.92 | 0.31 | 0.11 | 0.06 | 11.3 | 0.67 | 0.07 | 0.04 | 0.07 |
| S | 1352 | 1300 | 1226 | 1120 | 1012 | 1414 | 1369 | 1210 | 1115 | 1337 |
| t | 42 | 43 | 46 | 46 | 47 | 40 | 40 | 43 | 44 | 37 |
| CS | 1482 | 1424 | 1319 | 1204 | 1107 | 1502 | 1446 | 1299 | 1201 | 1426 |
| DOL | 19 | 20 | 21 | 22 | 22 | 18 | 18 | 19 | 20 | 17 |
| CT | 30 | 30 | 28 | 27 | 26 | 28 | 28 | 26 | 25 | 25 |
| CS for P | — | — | — | — | — | — | — | — | — | — |
| DOL for P | — | — | — | — | — | — | — | — | — | — |
| P | — | — | — | — | — | — | — | — | — | — |
| Z | 1333 | 1342 | 1278 | 1217 | 1156 | 1390 | 1324 | 1197 | 1135 | 1226 |
| Z2 | 1352 | 1341 | 1252 | 1163 | 1074 | 1459 | 1362 | 1183 | 1095 | 1302 |
| Z3 | 0.177 | 0.190 | 0.148 | 0.108 | 0.066 | 0.207 | 0.164 | 0.079 | 0.038 | 0.086 |
| Z4 | 47 | 47 | 43 | 40 | 37 | 51 | 47 | 41 | 37 | 42 |
| X | 0.2 | 0.2 | 0.3 | 0.4 | 0.5 | 0.1 | 0.2 | 0.4 | 0.5 | 0.8 |

TABLE 5

| | Ex. | | | | | |
|---|---|---|---|---|---|---|
| | 41 | 42 | 43 | 44 | 45 | 46 |
| $SiO_2$ | 63.4 | 64 | 64 | 64 | 64 | 68.2 |
| $Al_2O_3$ | 10.9 | 12 | 12 | 12 | 12 | 10.9 |
| $B_2O_3$ | 0 | 0 | 0 | 0 | 0 | 0 |
| MgO | 7.9 | 8 | 8 | 7 | 6 | 5.8 |
| CaO | 0 | 0 | 0 | 0 | 0 | 0.1 |
| $ZrO_2$ | 2.0 | 1 | 2 | 1 | 2 | 0 |
| $Na_2O$ | 15.8 | 15 | 14 | 16 | 16 | 15.1 |
| $K_2O$ | 0 | 0 | 0 | 0 | 0 | 0 |
| E | 77* | 78 | 75 | 76 | 76 | 73* |
| d | 2.53* | 2.51 | 2.48 | 2.51 | 2.48 | 2.44* |
| Tg | 645* | 705 | 676 | 693 | 689 | 644* |
| T2 | 1668* | 1724* | 1770* | 1701* | 1724* | 1752* |
| T4 | 1250* | 1310* | 1349* | 1282* | 1292* | 1303* |
| TL | — | 1250-1260 | — | — | — | — |
| α | 88* | 77 | 86 | 81 | 80 | 82* |
| Acid resistance | 0.06 | 0.06 | 0.06 | 0.11 | 0.07 | 1.1 |
| S | 1418 | 1325 | 1344 | 1356 | 1437 | 1044 |
| t | 34.3 | 50 | 31.4 | 40 | 39.6 | 49 |
| CS | 1488 | 1420 | 1406 | 1439 | 1514 | 1085 |
| DOL | 15 | 17 | 14 | 18 | 18 | 22 |
| CT | 24 | 24 | 21 | 28 | 28 | 25 |
| CS for P | — | — | — | — | — | — |
| DOL for P | — | — | — | — | — | — |
| P | — | — | — | — | — | — |
| Z | 1193 | 1238 | 1216 | 1245 | 1230 | 1154 |
| Z2 | 1339 | 1353 | 1433 | 1352 | 1431 | — |
| Z3 | 0.052 | 0.086 | 0.051 | 0.097 | 0.073 | — |
| Z4 | 41 | 44 | 44 | 43 | 42 | 38 |
| X | 1.2 | 0.7 | 1.1 | 0.7 | 1.1 | 0.4 |

TABLE 6

| | Ex. | | | | |
|---|---|---|---|---|---|
| | 47 | 48 | 49 | 50 | 51 |
| $SiO_2$ | 67 | 72.5 | 72 | 73 | 84 |
| $Al_2O_3$ | 11 | 6.2 | 1.1 | 9 | 3 |
| $B_2O_3$ | 0 | 0 | 0 | 0 | 0 |

TABLE 6-continued

| | Ex. | | | | |
|---|---|---|---|---|---|
| | 47 | 48 | 49 | 50 | 51 |
| MgO | 6 | 8.5 | 5.5 | 6 | 1 |
| CaO | 0 | 0 | 8.6 | 0 | 0 |
| $ZrO_2$ | 0 | 0 | 0 | 0 | 0 |
| $Na_2O$ | 13 | 12.8 | 12.8 | 12 | 12 |
| $K_2O$ | 2 | 0 | 0.2 | 0 | 0 |
| E | 71 | 71 | 73 | 72 | 59 |
| d | 2.44 | 2.41 | 2.49 | 2.40 | 2.33 |
| Tg | 595 | 627 | 540 | 683 | 589 |
| T2 | 1825 | 1697 | 1681 | 1838 | 1853 |
| T4 | 1354 | 1214 | 1116 | 1342 | 1242 |
| TL | — | — | — | — | — |
| α | 93 | 74 | 88 | 71 | 66 |
| Acid resistance | 0.02* | 0* | 0.02 | 0* | 0* |
| S | 884 | 864 | 600 | 1011 | 275 |
| t | 48 | 31 | 14 | 52 | 74 |
| CS | 919 | 899 | 624 | 1051* | 286* |
| DOL | 28 | 18 | 8 | 30* | 43* |
| CT | 27 | 17 | 5 | 34* | 13* |
| CS for P | 899 | 790 | 500 | — | — |
| DOL for P | 46 | 45 | 34 | — | — |
| P | 0.75 | 0.75 | 1 | 0.9* | 1* |
| Z | 863 | 895 | — | 995 | 612 |
| Z2 | — | 808 | — | 1042 | 561 |
| Z3 | — | −0.139 | — | −0.090 | −0.345 |
| Z4 | 19 | 27.1 | 6.8 | 33 | 10 |
| X | 1.6 | 0.88 | 4.83 | 0.6 | 1.2 |

TABLE 7

| | Ex. | | | | |
|---|---|---|---|---|---|
| | 52 | 53 | 54 | 55 | 56 |
| $SiO_2$ | 64.5 | 64 | 64.5 | 65 | 64.6 |
| $Al_2O_3$ | 12 | 12 | 11.5 | 12.5 | 12.1 |
| $B_2O_3$ | 0 | 0 | 0 | 0 | 0 |
| MgO | 8 | 8 | 8 | 8 | 8 |
| CaO | 0 | 0 | 0 | 0 | 0 |

TABLE 7-continued

| | Ex. | | | | |
|---|---|---|---|---|---|
| | 52 | 53 | 54 | 55 | 56 |
| $ZrO_2$ | 0.5 | 0.5 | 1 | 0.5 | 0.7 |
| $Na_2O$ | 15 | 15.5 | 15 | 14 | 14.6 |
| $K_2O$ | 0 | 0 | 0 | 0 | 0 |
| E | 75* | 75* | 76* | 76 | 76 |
| d | 2.47* | 2.47* | 2.5* | 2.47* | 2.48* |
| Tg | 678* | 672* | 679* | 694* | 686* |
| T2 | 1713* | 1695* | 1708* | 1754* | 1729* |
| T4 | 1276* | 1260* | 1269* | 1317* | 1291* |
| TL | 1250-1260 | 1240-1250 | 1230-1240 | >1250 | >1250 |
| α | 82* | 84* | 82* | 78* | 80* |
| Acid resistance | 0.056 | 0.07 | 0.03 | 0.04 | 0.04 |
| S | 1337 | 1361 | 1351 | 1316 | 1345 |
| t | 38.7 | 36.3 | 38.6 | 36.6 | 36.4 |
| CS | — | — | — | — | — |
| DOL | — | — | — | — | — |
| CT | — | — | — | — | — |
| CS for P | — | — | — | — | — |
| DOL for P | — | — | — | — | — |
| P | — | — | — | — | — |
| Z | 1230 | 1239 | 1249 | 1211 | 1245 |
| Z2 | 1314 | 1313 | 1312 | 1358 | 1339 |
| Z3 | 0.092 | 0.103 | 0.069 | 0.087 | 0.084 |
| Z4 | 42 | 44 | 44 | 42.5 | 45.5 |
| X | — | — | — | — | — |

INDUSTRIAL APPLICABILITY

The glass for chemical tempering and the chemically tempered glass of the present invention are useful for e.g. cover glasses for display devices. Further, they are useful for solar cell substrates, window glasses for aircrafts, etc.

What is claimed is:

1. A glass comprising, as represented by mole percentage based on the following oxides: from 62 to 69% of $SiO_2$; from 11.5 to 14% of $Al_2O_3$; from 11 to 16% of $Na_2O$; from 0 to 2% of $K_2O$; from 0 to 14% of MgO; from 0 to 2% of $ZrO_2$; and from 0 to 6% of $B_2O_3$,
wherein a difference obtained by subtracting the content of $Al_2O_3$ from the content of $Na_2O$ is less than 5%,
the glass has a glass transition temperature of at least 550° C.,
X calculated by the following formula by using the contents, as represented by mole percentage, of $SiO_2$, $Al_2O_3$, $Na_2O$ and MgO is at most 1.3, and
Z calculated by the following formula by using the contents, as represented by mole percentage, of $SiO_2$, $Al_2O_3$, $Na_2O$, MgO, $B_2O_3$ and $K_2O$ is at least 870:

$$X=-0.4\times SiO_2-0.5\times Al_2O_3-0.4\times Na_2O-0.4\times MgO+41.5,$$

$$Z=2\times SiO_2+55\times Al_2O_3+22\times Na_2O+15\times MgO-30\times B_2O_3-126\times K_2O.$$

2. The glass according to claim 1, wherein Z2 calculated by the following formula by using the contents, as represented by mole percentage, of $SiO_2$, $Al_2O_3$, $Na_2O$, MgO and $ZrO_2$ is at least 1,200:

$$Z2=3.5\times SiO_2+85\times Al_2O_3+0.80\times Na_2O+2.0\times MgO+81\times ZrO_2.$$

3. The glass according to claim 1, wherein Z4 calculated by the following formula by using the contents, as represented by mole percentage, of $Al_2O_3$, $K_2O$ and MgO is at least 24:

$$Z4=3\times Al_2O_3-10\times K_2O+MgO.$$

4. The glass according to claim 1, wherein a difference obtained by subtracting the content of MgO from the content of $SiO_2$ is at most 64%.

5. The glass according to claim 1, wherein a difference obtained by subtracting the content of MgO from the content of $Al_2O_3$ is at most 9%.

6. The glass according to claim 1, wherein the content of CaO is less than 1%.

7. The glass according to claim 1, wherein a total content of CaO, SrO, BaO and $ZrO_2$ is less than 1.5%.

8. The glass according to claim 1, further comprising from 0 to 0.05% of $Li_2O$.

9. The glass according to claim 1, wherein a total content of $SiO_2$ and $Al_2O_3$ is at most 80%.

10. The glass according to claim 1, wherein a total content of $SiO_2$, $Al_2O_3$, $Na_2O$ and MgO is at least 98%.

11. The glass according to claim 1, wherein Y1 calculated by the following formula by using the contents, as represented by mole percentage, of $SiO_2$, $Al_2O_3$, $Na_2O$, MgO, $K_2O$ and $B_2O_3$ is less than −600:

$$Y1=SiO_2+15\times Al_2O_3-50\times Na_2O-25\times K_2O-25\times MgO-25\times B_2O_3.$$

12. The glass according to claim 1, wherein Y2 calculated by the following formula by using the contents, as represented by mole percentage, of $SiO_2$, $Al_2O_3$, $Na_2O$, MgO, $K_2O$ and $B_2O_3$ is less than −245:

$$Y2=SiO_2+25\times Al_2O_3-40\times Na_2O-20\times K_2O-10\times MgO-10\times B_2O_3.$$

13. The glass according to claim 1, wherein no $B_2O_3$ is contained.

14. The glass according to claim 1, wherein Z3 calculated by the following formula by using the contents, as represented by mole percentage, of $SiO_2$, $Al_2O_3$, $Na_2O$, MgO and $ZrO_2$ is at most 0.150:

$$Z3=-0.00722\times SiO_2+0.0264\times Al_2O_3+0.0149\times Na_2O+0.0035\times MgO-0.0204\times ZrO_2.$$

15. The glass according to claim 1, wherein R calculated by the following formula by using the contents, as represented by mole percentage, of $SiO_2$, $Al_2O_3$, $Na_2O$, MgO and $K_2O$ is at least −100:

$$R=0.5\times SiO_2+15\times Al_2O_3-17\times Na_2O-5\times K_2O+1.5\times MgO.$$

16. The glass according to claim 1, wherein the glass has a temperature T2 at which a viscosity of the glass is $10^2$ dPa·s of at most 1,800° C.

17. The glass according to claim 1, wherein the glass has a temperature T4 at which a viscosity of the glass is $10^4$ dPa·s of at most 1,350° C.

18. The glass according to claim 1, wherein the glass has a liquid phase temperature lower than a temperature T4 at which a viscosity of the glass is $10^4$ dPa·s.

19. The glass according to claim 1, wherein X is at most 1.

* * * * *